Jan. 3, 1928.
T. H. McCLAIN ET AL
1,655,394
DOG RACING APPARATUS
Filed April 15, 1927
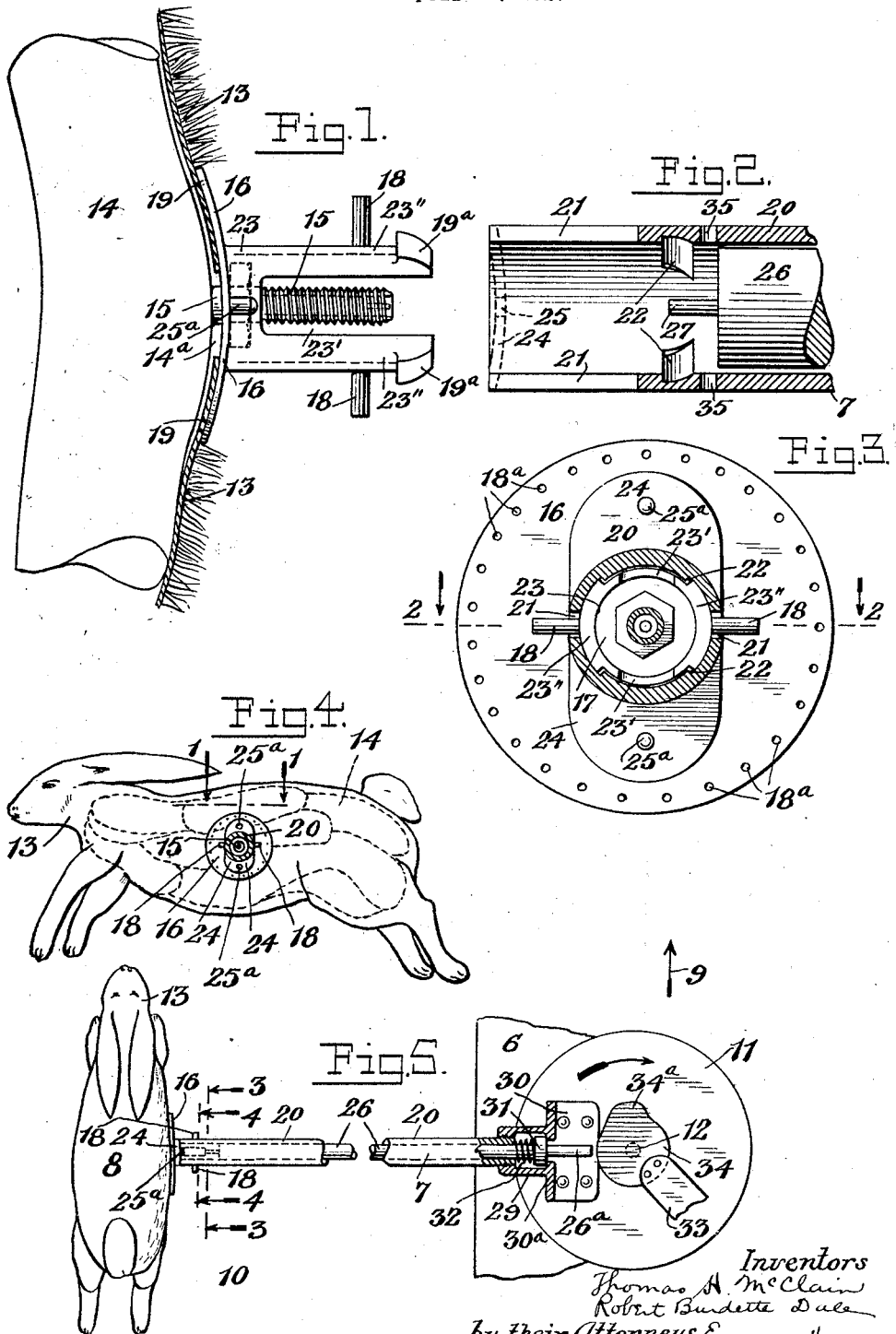
Inventors
Thomas H. McClain
Robert Burdette Dale
by their Attorneys Edward & Henry Patented Jan. 3, 1928.

1,655,394

UNITED STATES PATENT OFFICE.

THOMAS H. McCLAIN, OF CLIFFSIDE PARK, NEW JERSEY, AND ROBERT BURDETTE DALE, OF NEW YORK, N. Y., ASSIGNORS TO MILTON J. GORDON, OF NEW YORK, N. Y.

DOG-RACING APPARATUS.

Application filed April 15, 1927. Serial No. 184,055.

This invention relates to dog-racing stadia such as have lately come to be rather widely used for amusement enclosures wherein grey hounds or other dogs race around a predetermined path, hereinafter called the running path or course, in a speed contest stimulated by an artificial rabbit or other lure carried around the course ahead of the dogs.

In a racing contest of this kind, the lure is commonly mounted on one end of a support the other end of which is connected to a carrier means adapted to sweep the support and lure along the course at a high rate of speed.

One of the objects of the present invention is to provide a very light weight lure and yet one which may be otherwise entirely satisfactory both as to wind-withstanding ability, and as to having the proper rotundity or thickness transverse to its direction of travel to maintain a highly deceptive resemblance to a live animal.

Sometimes the support is extended horizontally over the course, the carrier then usually running on tracks in a trench alongside the course. Sometimes, the support extends upwardly through a slot along the course, the carrier being in a tunnel or chamber below the course. In both of these cases, it is desirable, as for instance by a suitable mechanism such as is disclosed and claimed in copending application Ser. No. 184,053, filed April 15, 1927, to withdraw the normally exposed part of the support and the lure thereon from reach by the dogs, as when, due to some fault in the equipment, the carrier slows down below a permissible minimum speed. The object of this is to prevent the valuable dogs from injuring themselves by dashing against the support, and also to protect them from catching the lure and thus learning that the object of their pursuit during a race is merely a dummy. It will be understood that the lure, particularly, when having the rotundity of shape above referred to, can not well be withdrawn in that condition through the usual slot provided for protecting the dogs from access to the carrier and along which slot the support travels during movement of the carrier lengthwise of the course.

Another object of the present invention is to provide a lure which may have the advantages aforesaid and yet which is readily collapsible, so that when the lure-carrying end of the support is passed through the slot during withdrawal of the support from the course, the lure may also be withdrawn through said slot.

Another object is to provide a lure as last described and means associated therewith such that collapse of the lure is automatic and comparatively instantaneous on a movement of the support relative to the carrier and to withdraw the support from the course through the slot or equivalent.

Another object is to provide an air inflatable lure which may have as its covering a piece of fur, preferably the skin of a real rabbit or the like which has been killed, and yet a lure casing which may be maintained inflated without relying on the casing itself as the air-tight confiner of the inflating fluid.

Another object is to provide a lure as last described, and one wherein an air-tight liner and container for the inflating fluid need not be specially made or of a shape conforming closely to the hollow interior of the animal skin when expanded to life-like rotundity.

Various other objects and advantages of the invention than those hereinabove mentioned will be specifically pointed out or will be apparent hereinafter, in the course of the below detailed description of the form of the invention shown in the accompanying drawing, as a preferred one of the various possible embodiments of the invention; it being understood, naturally, that such form is merely illustrative of one of the many possible combinations and arrangements of parts whereby the objects of the invention may be attained, and hence said detailed description of such form is not to be taken as at all defining or limiting the invention itself. That is to say, the scope of protection contemplated is of course to be taken from the appended claims, interpreted as broadly as is consistent with the prior art.

In the accompanying drawing:

Fig. 1 is a view partially in top plan and partially in horizontal section, and showing details on a very much enlarged scale, taken approximately on the line 1—1 of Fig. 4;

Fig. 2 is in the main a horizontal axial section taken substantially on the line 2—2 of Fig. 3, but showing only the outer end of the lure support, that is, the left end thereof as seen in Fig. 5, and not showing the parts of Fig. 1 illustrated in Fig. 3 as latch-coupled in said end of said support;

Fig. 3 is a vertical section, taken on the line 3—3 of Fig. 5, but of course on the same scale as Figs. 1 and 2 and hence on a much larger scale than that of Fig. 5;

Fig. 4 is a vertical section taken on line 4—4 of Fig. 5; and

Fig. 5 is a top plan view, partially broken away and partially in section, showing a part of the truck or other carrier which runs alongside the course and other parts carried by such truck including the lure and a support therefor of the type adapted to be extended over and transverse to the course and to be swung about a vertical axis on the truck to withdraw the support and lure from the course on the occurrence of an emergency such as already hereinabove referred to, e. g., a failure of the motive power or equipment for the truck.

Similar reference characters refer to similar parts, throughout the several views of the drawing.

Referring first to Fig. 5, a portion of the truck is indicated at 6. This truck carries a horizontally extending arm-like support 7 for the lure 8, here shown as a rabbit. Assuming the rabbit 8 to be headed as indicated in Fig. 5, the truck path of travel, on suitable guiding means (not shown) will be as indicated by the arrow 9. Then, the support 7 will be extended transverse to the course 10, or, with the truck 6 and support 7 associated with means for withdrawing the arm and lure from the dogs on the support of the truck dropping below a permissible minimum, the arm will be normally extended as shown in Fig. 5 but adapted to be swung to extend in the direction of the arrow 9 on a quarter revolution of a disc 11 pivoted at 12 on the truck chassis and forming a part of a suitable mechanism for thus swinging the support 7 when the speed of the truck drops below a permissible minimum.

The swinging mechanism mentioned may be that disclosed and claimed in the aforesaid copending application; in which application the carrier illustrated is a familiar type of a small electric truck, having four wheels travelling on a railway track surrounding the running path or course, carrying a motor receiving current from a third rail, and moving through a trench at one side of the course along the length thereof and in which the rails are laid.

Referring to Figs. 4 and 5, the lure here shown includes a rabbit skin 13, suitably stitched together to join the edges where the skin was slit to remove it from the rabbit carcass, the fur side of the skin being left outermost. There is thus provided a hollow limp casing such as is ordinarily permanently distended by a stuffing of cotton wadding or similar material. Here, however, the body of such casing contains an inflatable liner or air confiner preferably present as an ordinary bicycle inner tube 14 as shown clearly in Figs. 1 and 4. A hole, indicated at 14ª in Fig. 1, is cut through the skin, for the protrusion of the valve housing commercially carried by these tubes. Such housing is indicated at 15.

Referring to Figs. 1, 3, 4 and 5, a light metal circular plate 16, having a central opening 17 for the protrusion of valve housing 15, has a series of circumferentially arranged apertures 18ª by which the plate may be stitched to the skin 13 as indicated at 19. Opening 17 is surrounded by an outwardly extended sleeve 23 having opposite longitudinal slots 23′ to provide outwardly projecting somewhat resilient prongs or tines 23″. These tines carry transverse oppositely outwardly projecting pins 18, and at their free ends are shaped to present projections as shown at 19ª in Fig. 1.

Referring next to Figs. 2, 3, 4, and 5, the arm or support 7 includes an outer tube or sleeve 20 having at its outer end, that is, at its left end as viewed in Fig. 5, features of construction shown most clearly in Fig. 2. At each side of the tube or sleeve 20, and in the same horizontal plane, the sleeve is provided at its outer or lure-mounting end with a pair of longitudinal slots 21 adapted to receive pins 18 as shown best in Fig. 3, and this end of the sleeve 20 is also provided, beyond the inner ends of slots 21, with a pair of keeper recesses 22 for projections 19. These projections, due to the resilient yieldability of the root portions of tines 23″, snap-latch into locking engagement with the recesses 22 when the parts shown in Fig. 2 have been moved to the left to telescope completely the sleeve 23 of Fig. 1 and so dispose the pins 18 in the slots 21 at the inner ends of the latter. It will be seen from Fig. 3 that the pins 18 are not snugly fitted in slots 21. This is to permit the necessary play between the parts to allow the lure to be snap-latched on the outer end of support 7 as just described, and also to permit the lure to be readily removed from the outer end of the support, by pressing the outer end of the pins 18 toward each other to slightly spring in the tines 23″; ready attachment and detachment of the lure relative to the support 7 being desirable at times, as to inflate or reinflate the tubing 14 whenever required. In order, however, to squarely and solidly mount the lure on the outer end of the support 7, the outer end of the tube 20, at top and bottom, that is, at opposite sides of the plane of the slots 21, is provided with a pair of plate extensions 24. Each such extension has a hole, as marked at 25 in Fig. 2, into which fit with rigidifying snugness a pair of projections or posts 25ª on plate 16, when the parts of Figs. 1 and 2 have been assembled as shown in Fig. 3 and the latch projections 19 are snapped into their keeper recesses 22.

In order to provide means for deflating the collapsible lure when desired, slidably mounted within tube 20 is a rod 26 carrying at its outer end a pin 27 for engaging the familiar deflating stem 28 forming part of the valve mechanism in valve housing 15, and thus for deflating the lure when the rod 26 is moved to the left in Figs. 2 and 5. Any suitable means may be provided for thus actuating the rod or an equivalent; but in the present case, which illustrates an embodiment of the invention wherein the lure is designed to be deflated automatically incident to a relative movement between the support 7 and the truck 6, and where the truck 6 is for example of the type already described, the lure deflating means includes the parts already referred to, and also the following. The inner end of the support 7, or rather of an outer tube 20, is screwed into a nipple 29 formed integral with a bracket 30 secured to the support withdrawing disc 11. Within the nipple chamber is a collar 31 secured on rod 26, such collar coacting with the wall 30ᵃ of the bracket to limit the movement of the rod 26 to the right axially of tube 20, and there is also in said chamber an expansile coil spring 32 arranged always to urge said rod to the extreme of such rightward movement. Fixed to a suitable support 33 suitably secured in a manner not shown to the truck body, is a cam 34 having a nose 34ᵃ. This nose is so positioned that on a 90° swinging movement of support 7 relative to the truck, in the direction of the arrow shown on disc 11, the part 26ᵃ of rod 26 projecting inwardly toward the center of rotation of the disc, will engage said nose. Thereby, incidental to said swinging movement of support 7, the rod 26 will be moved axially of sleeve 20, against spring 32, and in a direction to cause the pin 27 of Fig. 2 to engage the stem 28 of Fig. 1 and bring about complete deflation of the lure by the time the support 7 has finished its swinging movement. Parts 35 are provided in tube 20 as shown in Fig. 2 to allow for the escape of the inflation air of the lure.

Inasmuch as many changes could be made in the above construction, and many apparently widely different embodiments of the invention could be made without departing from the scope thereof, it is intended that all matter contained in the above description or shown in the accompanying drawing shall be interpreted as illustrative and not in a limiting sense.

It is also to be understood that the language contained in the following claims is intended to cover all the generic and specific features of the invention herein described and all statements of the scope of the invention which, as a matter of language, might be said to fall therebetween.

We claim:

1. In dog racing apparatus, wherein a running track for dogs is arranged alongside a rail-track for a wheeled carrier having a laterally projecting lure support and wherein there is a dog-protecting wall between the rail-track and the running track presenting a slot through which is protruded said support and along which said support travels during movement of the carrier, the combination with such a carrier, of a support for the lure mounted on the carrier for movement relative thereto, whereby such support and the lure may be withdrawn from the running track and through said slot to the rail-track side of said wall, and means for thus withdrawing the lure with said support and at the same time permitting said slot to be of a width too small to permit a dog to injure himself thereagainst and too small to permit the lure as run over the course to pass through said slot with the support, said means including a hollow inflated lure, and means for deflating the lure on moving the support relative to the carrier.

2. In dog racing apparatus, wherein a running track for dogs is arranged alongside a rail-track for a wheeled carrier having a laterally projecting lure support, the combination with such carrier of a lure support comprising a comparatively long rigid arm laterally offset from the carrier, and a lure on the outer end of said arm simulating a live animal, said lure being of hollow construction and air inflated, said lure having a cover of limp material and an inflatable rubber liner of ring-shaped type folded on itself in said cover.

3. In a dog racing apparatus, a movable carrier, an inflatable member supported laterally and distantly therefrom and constituting the lure, said member being adapted for movement to and from said carrier, and means for automatically deflating said member upon a movement of said member toward said carrier.

THOS. H. McCLAIN.
ROBERT BURDETTE DALE.